(12) United States Patent
Tsihlas et al.

(10) Patent No.: US 11,345,107 B2
(45) Date of Patent: May 31, 2022

(54) METHOD OF RETREADING A TIRE

(71) Applicant: COMPAGNIE GENERALE DES ETABLISSEMENTS MICHELIN, Clermont-Ferrand (FR)

(72) Inventors: Dimitri Tsihlas, Greer, SC (US); E. Bruce Colby, Greenville, SC (US); Cesar E. Zarak, Simpsonville, SC (US); Michael Widmyer, Duncan, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 274 days.

(21) Appl. No.: 16/433,578

(22) Filed: Jun. 6, 2019

(65) Prior Publication Data
US 2019/0283353 A1    Sep. 19, 2019

Related U.S. Application Data

(62) Division of application No. 14/439,183, filed as application No. PCT/US2012/062885 on Oct. 31, 2012, now abandoned.

(51) Int. Cl.
*B29D 30/56* (2006.01)
*B29D 30/54* (2006.01)
(Continued)

(52) U.S. Cl.
CPC ............. *B29D 30/54* (2013.01); *B29D 30/56* (2013.01); *B60C 11/01* (2013.01); *B60C 11/02* (2013.01)

(58) Field of Classification Search
CPC ................................ B29D 30/54; B29D 30/56
See application file for complete search history.

(56) References Cited

U.S. PATENT DOCUMENTS 2,303,164 A    11/1942   Hawkinson
3,753,821 A    8/1973    Ragen
(Continued)

FOREIGN PATENT DOCUMENTS

DE         1028448 B       4/1958
DE         1232845 A  *    1/1967
(Continued)

OTHER PUBLICATIONS

Machine translation for German 1232845 (Year: 2021).*
(Continued)

*Primary Examiner* — Steven D Maki
(74) *Attorney, Agent, or Firm* — Hahn Loeser & Parks LLP; Bret A. Hrivnak

(57) ABSTRACT

A tread for bonding to a tire carcass to form a retreaded tire having a length, a width, a top side and a bottom side. The tread also includes a central portion and a pair of wing portions extending laterally from the central portions. The top sides of each wing portion include one or more discontinuities having a longitudinal component and configured to resist deflection when subjected to a force from the bottom side and to deflect downwardly when subjected to a force from the top side. In particular embodiments, the one or more discontinuities are arranged within each wing portion are arranged within a thickened portion of each wing portion.

13 Claims, 5 Drawing Sheets

(51) Int. Cl.
*B60C 11/01* (2006.01)
*B60C 11/02* (2006.01)

(56) References Cited

U.S. PATENT DOCUMENTS

| | | | |
|---|---|---|---|
| 4,088,521 A | | 5/1978 | Neal |
| 5,115,849 A | | 5/1992 | Corner |
| 5,759,322 A | | 6/1998 | Courel et al. |
| 5,868,880 A | | 2/1999 | Pouille et al. |
| 6,843,291 B1 | | 1/2005 | Gaudin |
| 2010/0323583 A1 | * | 12/2010 | Hetzel .................... B29D 30/52 451/28 |

FOREIGN PATENT DOCUMENTS

| DE | 1232845 B | | 1/1967 |
|---|---|---|---|
| EP | 709237 A2 | * | 5/1996 |
| EP | 709237 A2 | | 5/1996 |
| JP | 58-081806 A | * | 5/1983 |
| JP | 58081806 A | | 5/1983 |
| JP | 04153029 A | | 5/1992 |
| JP | 06032114 A | | 2/1994 |
| JP | 06191225 A | | 7/1994 |
| JP | 07-108629 A | * | 4/1995 |
| JP | 2002-086588 A | * | 3/2002 |
| JP | 2003236949 A | | 8/2003 |

OTHER PUBLICATIONS

Machine translation for Japan 2002-086588 (Year: 2021).*
Machine translation for Japan 07-108629 (Year: 2021).*
Machine translation for Japan 58-081806 (Year: 2021).*
PCT/US2012/062885 International Search Report and Written Opinion dated Feb. 1, 2013, 24 pages.

* cited by examiner

METHOD OF RETREADING A TIRE

This application is a divisional application of, and claims priority to and the benefit of, U.S. patent application Ser. No. 14/439,183, filed Apr. 28, 2015 with the United States Patent and Trademark Office, which is a national phase entry of International Patent Application No. PCT/US2012/062885, filed Oct. 31, 2012 with the United States Patent and Trademark Office (acting as the US Receiving Office), all of which are hereby incorporated by reference.

BACKGROUND OF THE INVENTION

The present invention is in the field of retreaded tires.

When tires become worn, they can be restored with new tread band or tread layer. Large truck tires are typically retreaded as part of a routine tire-management program. The carcass of a truck tire is expected to last several hundred thousand miles and be amenable to having a new tread layer adhered to it several times. New truck tires are quite expensive and are therefore bought with the expectation that their high initial costs are offset by the long service life of the carcass and the low comparative cost of retreading.

A variety of procedures and different types of equipment are available for use in recapping or retreading pneumatic tires. One of the first steps in retreading a worn tire is to remove existing tread layer material from the tire carcass by an abrading procedure known as buffing. Next a layer of what is known as "cushion gum" is applied to the carcass. This cushion gum layer may comprise extruded, uncured rubber stitched or adhesively bonded to the carcass. Next, a tread band layer is applied atop the layer of cushion gum. In the cold recapping process, the tread band layer is cured rubber, and has a tread pattern already impressed in its outer surface. The tire is then placed in an autoclave, and heated under pressure for an appropriate time to induce curing of the gum layer, and binding of the gum layer to the bottom side, also known as the sole side, of the tread band layer and the carcass. The term "cure" refers to the formation of cross-links between the elastomer molecules in the rubber compound. It is further noted that there are various methods of bonding the tread layer to the carcass that may be employed, such as the use of adhesives, bonding agents, cushion gums, etc., and all methods of bonding the tread layer to the carcass known in the art are included when referring to the term "bonding interface."

Tread band layers for such procedures may be provided with wings extending from the shoulder or along the longitudinal edge of or extending along a lateral the tread band, which are subsequently rolled or folded down over a portion of the carcass sidewall prior to bonding. The wings may be included on a tread band in order to provide extra protection to the sidewalls, to provide an improved aesthetic appearance, and for additional reasons known in the field of retreaded tires.

SUMMARY OF THE INVENTION

A particular embodiment of the present disclosure includes a tread for bonding to a tire carcass to form a retreaded tire comprising a tread body having a length extending in a longitudinal direction, a width extending in a lateral direction, a top side, and a bottom side for bonding to the tire carcass. The tread includes a central portion having a bottom side forming a portion of the bottom side of the tread and a top side forming a portion of the top side of the tread, wherein the central portion top and bottom sides define a central thickness. Further, the tread includes a pair of opposed wing portions extending laterally from the edges of the central portion along the length of the tread, each wing having a bottom side forming a portion of the bottom side of the tread and a top side forming a portion of the top side of the tread, wherein a wing portion top and bottom sides define a wing thickness. The top sides of the wing portions include a discontinuity having a longitudinal component, and the wing portions are configured to resist deflection when subjected to a force from the bottom side and to deflect when subjected to a force from the top side.

In another particular embodiment of the present disclosure, a tread for bonding to a tire carcass to form a retreaded tire includes a length extending in a longitudinal direction, a width extending in a lateral direction, a top side having a portion for engaging the ground, and a bottom side for bonding to the tire carcass. The tread also includes a central portion having a bottom side forming a portion of the bottom side of the tread and a top side forming a portion of the top side of the tread, wherein the central portion top and bottom sides define a central thickness, and a pair of opposed wing portions extending laterally from the edges of the central portion along the length of the tread. Each wing has a bottom side forming a portion of the bottom side of the tread and a top side forming a portion of the top side of the tread, wherein a wing portion top and bottom sides define a wing thickness. The tread is precured with the wings deflected downwardly for engaging a bonding surface of the tire carcass.

Still another particular embodiment of the present disclosure includes a method for retreading a tire. The method comprises the steps of providing a tire carcass having a prepared bonding surface and providing a tread including a tread body having a length extending in a longitudinal direction, a width extending in a lateral direction, a top side, and a bottom side for bonding to the tire carcass. The tread body includes a central portion having a bottom side forming a portion of the bottom side of the tread body and a top side for engaging the ground, wherein a central thickness is defined by the top side and the bottom side of the central portion. The tread body also includes a pair of opposed wing portions extending laterally from the edges of the central portion along the length of the tread body, each wing having a bottom side forming a portion of the bottom side of the tread body and a top side, wherein a wing thickness is defined by the top side and the bottom side of the wing portions and at least of portion of the wing thickness is less than the central thickness. The central thickness is greater than the wing thickness and further wherein at least one discontinuity having a longitudinal component is formed in the top sides of the wing portions. The method also comprises the steps of roughening the bottom side of the tread body, contacting the bottom side of the tread body with the prepared bonding surface, and bonding the tread to the tire carcass.

DETAILED DESCRIPTION OF PARTICULAR EMBODIMENTS

Figure 1:
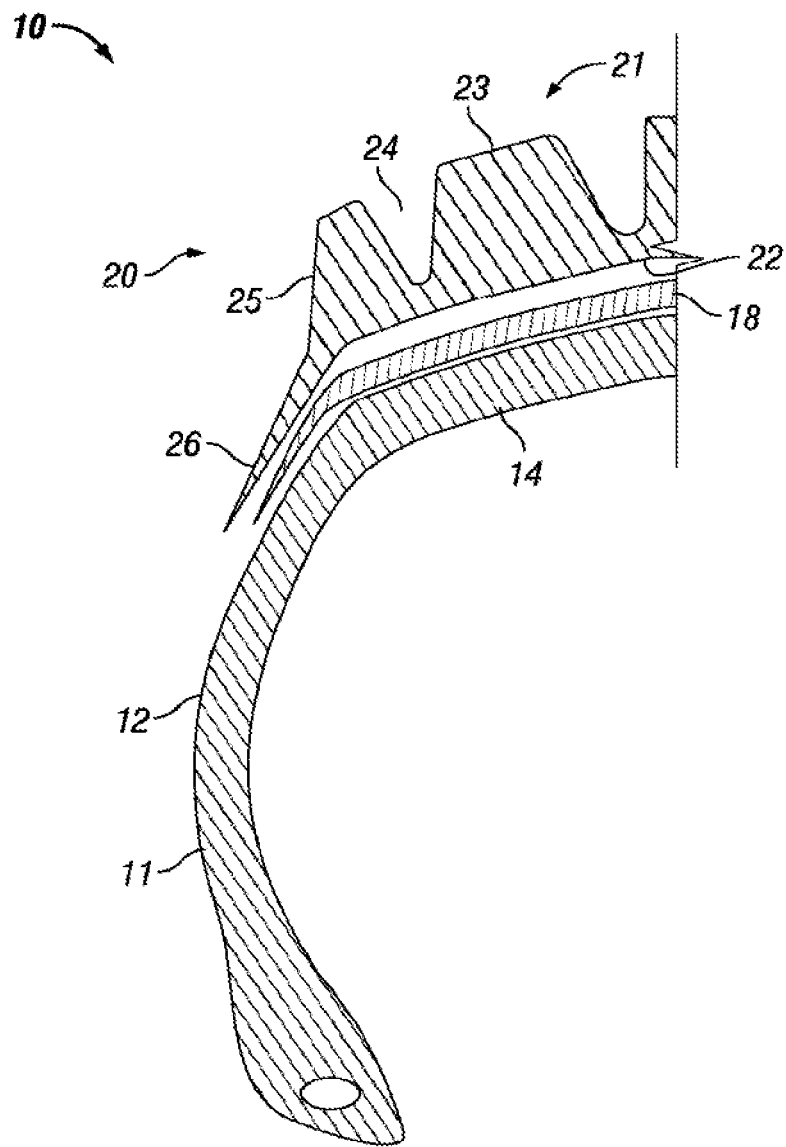
FIG. 1 is a partial cross-sectional partially exploded view of an exemplary retread tire of the prior art, where the tread wing is shown in a post-deflected attached arrangement.

Particular embodiments of the present invention include treads for bonding to the carcass of a tire being retreaded and the retreaded tires having such treads bonded thereto. Other embodiments include methods for bonding such treads to a tire being retreaded. The treads that are bonded to the tire carcass have wing portions extending laterally from a central portion of the tread. These wing portions are deflected or rolled over to cover a portion of the sidewall prior to bonding, as will be later described. Prior to the bonding process, the bottom sides of the treads are brushed or otherwise roughened or abraded to increase the ability to bond with a cushion gum layer. A problem that occurs with such wing portions is that because the thickness of the wing portions is less than that of the central portion of the tread, the wings deflect away from the abrading device, which increases the difficulty in abrading or roughening the bottom side of the wing portions, which in turn can affect adhesion between the tread band and the tire carcass. To solve this problem, particular embodiments of the present invention include wing portions configured to resist deflection when subjected to an upward force applied to a bottom side of the wing and to deflect downwardly when subjected to a downward force applied from a top side of the wing.

In the present method for retreading a tire, a tire carcass having a prepared bonding surface is provided. The bonding surface may be covered with an adhesive or a cushion gum layer comprising a bonding layer placed on top of the surface to be bonded to aid in bonding a tread to the carcass.

A tread having desirous surface characteristics, which may include certain tread elements, such as ribs and/or blocks formed by voids arranged within a thickness of the tread, is also provided. The tread includes a central portion and a pair of opposed wing portions extending laterally from the lateral side edges of the central portion. The tread, which includes the central and wing portions, has a thickness being bounded by a top side and a bottom side of the tread. The wing portions are configured to resist deflection when subjected to a force directed toward the top side from the bottom side and to deflect or bend when subjected to a force directed toward the bottom side from the top side. This resistance may be achieved by increasing the thickness of the wing. In particular embodiments, a plurality of thickened portions forming reinforcing members are arranged along a length of any wing portion. With regard to wings strengthened by thickening, to facilitate deflection of any wing portion for attachment to a tire carcass, when necessary, any thickened portion of the tread includes one or more discontinuities extending into a thickness of the wing.

Prior to placing the tread in contact with the bonding surface, the bottom side of the tread is roughened or otherwise abraded or conditioned by an abrasion system, which may include a wire brush, a grinding wheel, or any other known abrasion devices. In particular instances, given the configuration of the wing portions presently disclosed, the entire bottom portion of the tread experiences substantially the same contact with the abrasion system across its width. The bottom surface of the tread is then placed in contact with the prepared bonding surface, which may include folding the wing portions downwardly to contact a portion of the tire carcass, and the tread is then bonded or otherwise attached to the tire carcass.

FIG. 1 is a partial cross-sectional partially exploded view of an exemplary retread tire of the prior art. The retread tire 10 is shown comprising a tire carcass 12 having a crown section 14, and a sidewall section 11. Optionally, the tire carcass may include a reinforcement package. The retread tire further includes a cushion gum layer 18 and a tread 20, which may be provided in the precured state. The cushion gum layer 18 more generally represents a bonding layer that may comprise any known material useful for bonding the tread band 20 to the crown section 14 area and a portion of the sidewall section 11 of the retread tire 10. For example, the bonding layer may comprise an adhesive or any other natural or synthetic rubber or elastomer.

The tread 20 has a length extending in a longitudinal direction and a width extending in a lateral direction of the tread. The tread 20 further includes a thickness extending between a top side 23 and a bottom side 22 of the tread. The top side 23 has a portion configured for contacting or engaging the ground (that is, a ground surface) and providing traction during tire operation. Primary tread grooves 24 or other tread features, such as sipes, opening to the top side 23 of the tread may be provided with any tread elements formed along the top side. The bottom side 22 is configured to be bonded to the crown section 14 of the tire 10 by the cushion gum layer 18. The tread 20 includes a central portion 21, which is the portion of the tread between the shoulders or edges 25. The thickness of the central portion 21 is referred to as the central thickness, which is the distance between the top side 23 and the bottom side 22 of the tread in the central portion 21. Additionally, the tread 20 includes a pair of opposed wing portions, or wings, 26 extending laterally from opposing lateral sides of the central portion 21. Each wing 26 also has a thickness less than the thickness of the central portion, which is referred to as the wing thickness and corresponds to the distance between the top side 23 and the bottom side 22 of the tread in the wing portions.

In the retreading process, the bottom side of the tread may be subjected to an abrading process by an abrasion system so as to roughen or otherwise increase the texture of the bottom side. The abrasion system may include, for example, a grinding wheel or a wire brush. This texturing or roughening is performed in order to promote adhesion between the cushion gum material and the bottom side. During the abrasion process, the tread may move in a single direction over the fixed abrasion system while the abrasion system and bottom side of the tread are biased toward each other. Alternatively, the tread may be fixed and the abrasion system may move relative to the tread band, or both the tread band and the abrasion system may move simultaneously relative to each other. Regardless of implementation, the force of the abrasion system against the bottom side, the force of the bottom side against the abrasion system, or a combination of both forces, in combination with the relatively thinner thickness of the wings, the wings may deflect away from the abrasion system, resulting in reduced, intermittent, or otherwise incomplete contact between the wings and the abrasion system. Accordingly, the bottom side of the wings may not be roughened to the same extent as the remainder of the tread bottom side.

Figure 4:
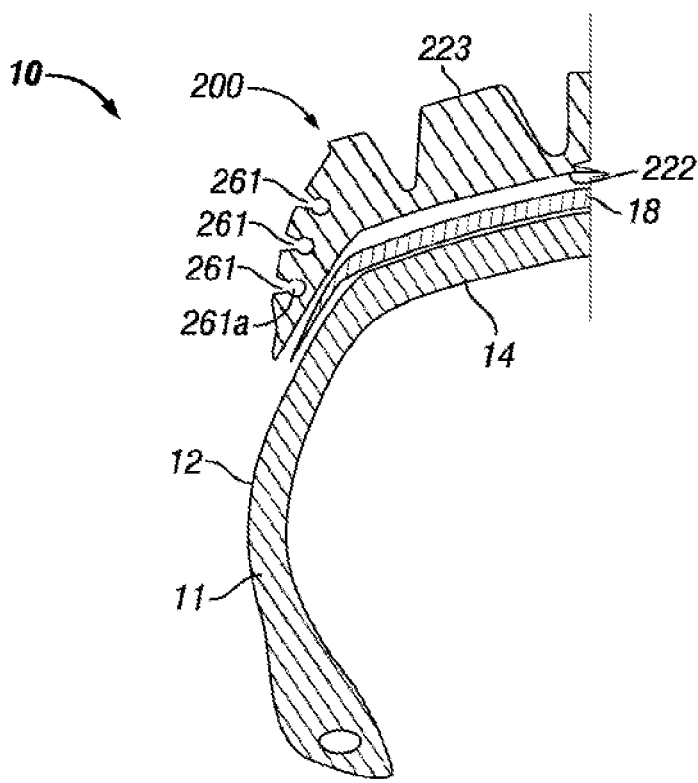
FIG. 4 is a partial cross-sectional partially exploded view of the tread shown in FIG. 3, where the wing was been deflected downwardly for attachment to the tire carcass in accordance with an embodiment of the invention.

In contrast to the prior art treads, the wing portions of the present disclosure are configured to resist deflection when subjected to an upward force from the bottom side and to deflect or bend when subjected to a downward force from the top side. As shown in FIGS. 2A-D, particular embodiments of the tread 200 having a bottom side 222 and a top side 223 include wing portions 260 having a discontinuity 261 formed in the top side thereof and extending depthwise into a thickness of the wing. The discontinuities 261 allow the wing to deflect downwardly into an installed arrangement along the tire carcass when the tread is strengthened to also resist any upward force applied to a bottom side of the tread. An exemplary tread is shown in an installed arrangement in FIG. 4, where the discontinuities are arranged in an open arrangement subsequent deflection of the wing. The discontinuity 261, which may comprise a slice or slit or a void, such as a sipe or groove, for example, may be molded into the wing 260 as a void or may be formed in the tread after the tread has been cured, for example, by slicing or cutting the tread or by any other means of lacerating or removing tread material from a tread. In each instance, the discontinuity 261 has a longitudinal component relative to the tread. In other words, at least a vector of the lengthwise orientation of the discontinuity 261 extends in the longitudinal direction, or along the length, of the tread 200. For example, with reference to FIGS. 2B-2D, the discontinuities 261 extend lengthwise in a longitudinal direction of the tread. Additionally, a vector of the orientation of the discontinuity 261 may be formed in the lateral direction, or along the width, of the tread 200. For example, with reference to FIG. 2A, the discontinuities 261 extend lengthwise at an angle biased to the longitudinal direction of the tread 200, or, in other words, in a direction non-parallel to the longitudinal direction of the tread.

In cross-section, the discontinuity 261 may comprise any desired discontinuity. For example, with reference to FIG. 2C, a discontinuity 261 may comprise an elongated slit or slice. By further example, with reference to FIG. 2A, a discontinuity 261 may comprise a narrow groove. Optionally, with reference to exemplary embodiments shown in FIGS. 2B and 2D, the discontinuity 261 may include a void 261a arranged at a terminal end of the discontinuity within the depth of the tread. It is understood the void 261a may comprise any desired void. For example, the void 261a may comprise a groove, which may extend continuously or discontinuously along a length of the discontinuity 261. In cross-section, the void 261a may comprise any shape. For example, the void 261a may comprise a tear-drop shaped groove, a v-bottomed groove, a u-bottomed groove, as well as other shape contemplated by one of ordinary skill in the art. It is contemplated that the discontinuities 261 may extend substantially perpendicular to the bottom side of the tread 222, may extend substantially parallel to the bottom side of the tread, may be oriented at some angle there between, or may include a combination of such orientations relative to the bottom side of the tread.

Figure 2A:
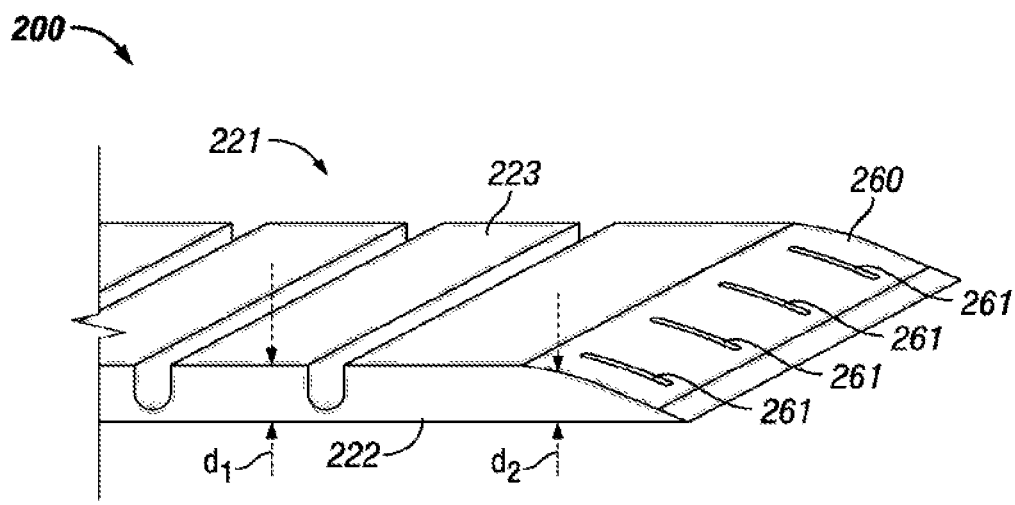
FIG. 2A is a perspective cross-sectional view of an exemplary tread having a plurality of discontinuities arranged within a thickened wing of the tread in accordance with an embodiment of the invention.
Figure 2B:
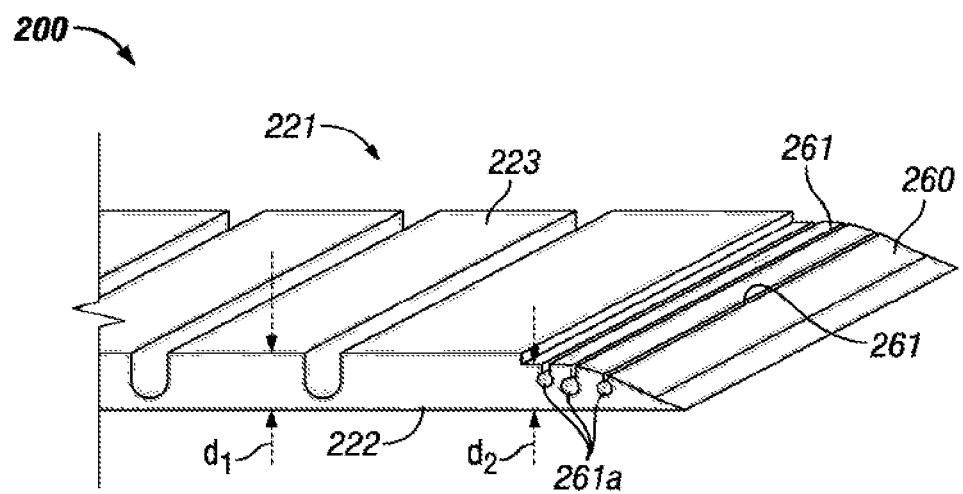
FIG. 2B is a perspective cross-sectional view of an exemplary tread having a plurality of discontinuities arranged within a thickened portion of a wing of the tread, the discontinuity having a void arranged at a terminal end thereof and extending lengthwise in a longitudinal direction of the tread in accordance with an embodiment of the invention.
Figure 2C:
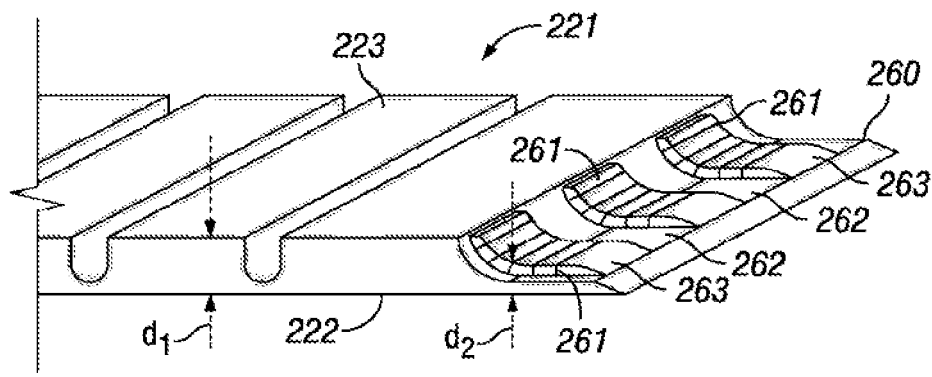
FIG. 2C is a perspective cross-sectional view of an exemplary tread having a plurality of discontinuities arranged within a thickened portion of a wing of the tread in accordance with an embodiment of the invention.
Figure 2D:
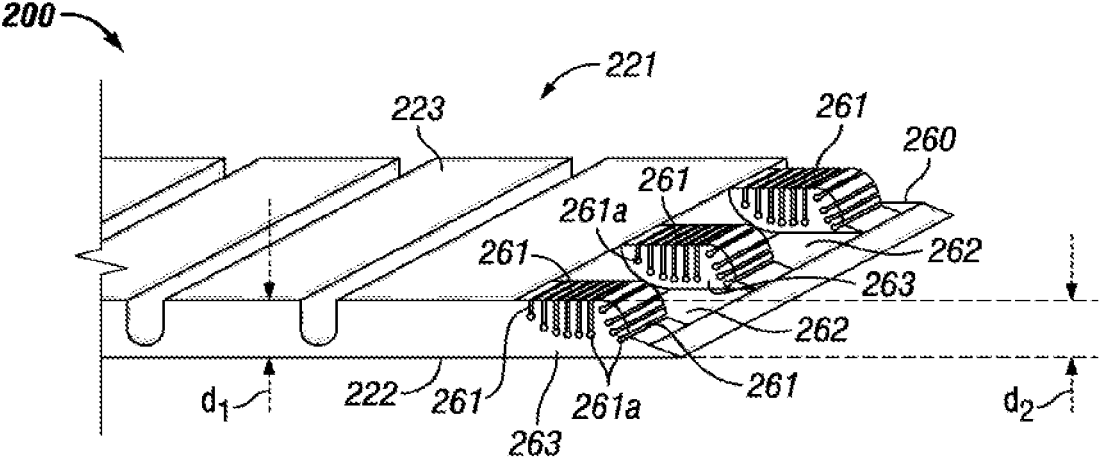
FIG. 2D is a perspective cross-sectional view of an exemplary tread having a plurality of discontinuities arranged within a thickened portion of a wing of the tread and extending depthwise into a thickness of the tread in different directions in accordance with an embodiment of the invention.

Referring now to FIGS. 2A-C, in particular embodiments, the wing thickness d2 may be less than the central thickness d1, which is the thickness of the tread within central portion 221. In other embodiments, as shown in FIG. 2D, the wing thickness d2 may have a portion that is equal to the central thickness d1, and a portion that is less than the central thickness. With regard to the particular embodiments of FIGS. 2A-D, however, it should be understood that the wing thickness d2 may be variable, and in particular, in a lengthwise direction of the wing. For example, in FIGS. 2C and 2D, thickened portions forming reinforcing members 263 are intermittently arranged or spaced along a length of the wing 260 to increase the strength or rigidity of the wings for the purpose of better resisting an upwardly directed force applied to the bottom side of the wing, such as may occur when abrading the bottom side of the wing. By further example, the treads exemplarily shown in FIGS. 2A and 2B are generally thickened along a length of the wing 260 to provide the increase in strength and rigidity for resisting upward deflection. However, to also allow the wing to deflect downwardly when at least partially thickened, in each instance with reference to FIGS. 2A-2D, any thickened portion of a wing includes one or more discontinuities 261. Furthermore, the wing thickness d2 may decrease from the central portion 221 to the edge of the wing portions 260, which correspond to the edges of the tread. It is contemplated that the wing portions 260 may have a convex profile, as shown in FIG. 2A-B, or a concave profile, as shown in FIG. 2C. Other profiles of the wing portions 260, including the profile shown in FIG. 2D, are also contemplated.

In particular embodiments, the discontinuity 261 may include one or a plurality of discontinuities, which may be continuous along the entire length of the tread 200, as shown in FIG. 2B. In other words, the discontinuity 261 may be uninterrupted along the length of the tread 200. In other particular embodiments, the wing portions 260 may include a plurality of lateral interruptions 262, as shown in FIGS. 2C-D. The lateral interruptions 262 may be molded in the tread 200 or may be formed in the tread after the tread has been unmolded.

Figure 3:
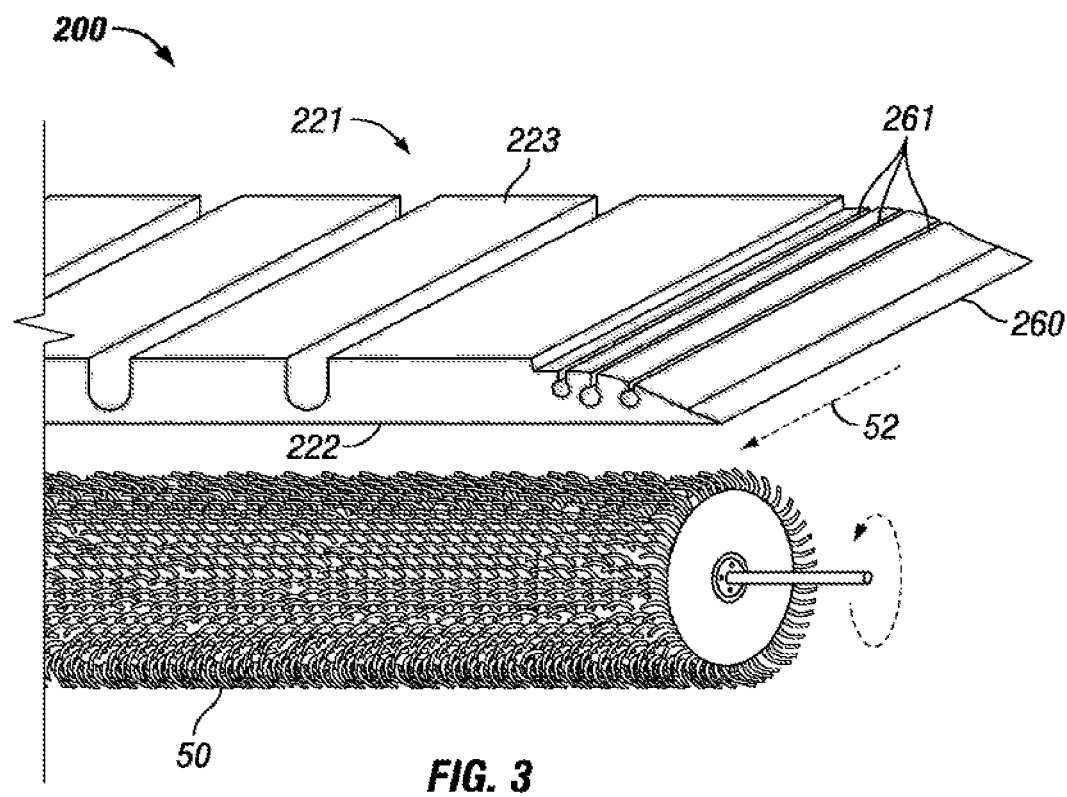
FIG. 3 is a perspective view of the exemplary tread shown in FIG. 1, where a bottom side of the tread is undergoing an abrasion process in accordance with an embodiment of the invention.

Particular embodiments of the methods of retreading a tire include the step of abrading or roughening the bottom side of the tread. In particular embodiments, during the step of abrading or roughening the bottom side of the tread, the pair of opposed wing portions do not substantially deflect, or, in other words, the opposed wing portions remain generally undeflected or rigid. For example, with reference to FIG. 3, in contrast to the treads of the prior art, the wing portions 260 of the present disclosure are configured to resist deflection during the roughening or abrading step of the retreading process. As shown, the discontinuities 261 may still permit some compression of the wings 260 in response to the upward force from an abrasion system 50 as the tread 200 moves in a single direction 52 across the fixed abrasion system, such as when the discontinuity is a narrow void. This limited deflection permits the bottom side 222 of the tread 200 to receive substantially the same amount of roughening across the width of the tread and may accordingly improve adhesion during the bonding step.

Particular embodiments of the methods of retreading a tire include the step of contacting the bottom side of the tread with the prepared bonding surface. Such methods may further include the step of bonding the tread to the tire carcass. By example, with reference to FIG. 4, prior to bonding, the tread 200 to the tire carcass 12, the wing portion 260 is deflected downwardly toward the bonding surface of the tire carcass due to the presence of discontinuities 261. While bending or deflecting the wing portion 260, the discontinuities 261 open up or expand in dimension, thereby enabling decreased resistance to downward deflection. As such, the bottom side 222 of the tread 200 may then be brought into contact with the prepared bonding surface of the tire carcass 12, and the tread may then be bonded or attached to the carcass to form a retreaded tire.

Figure 5:
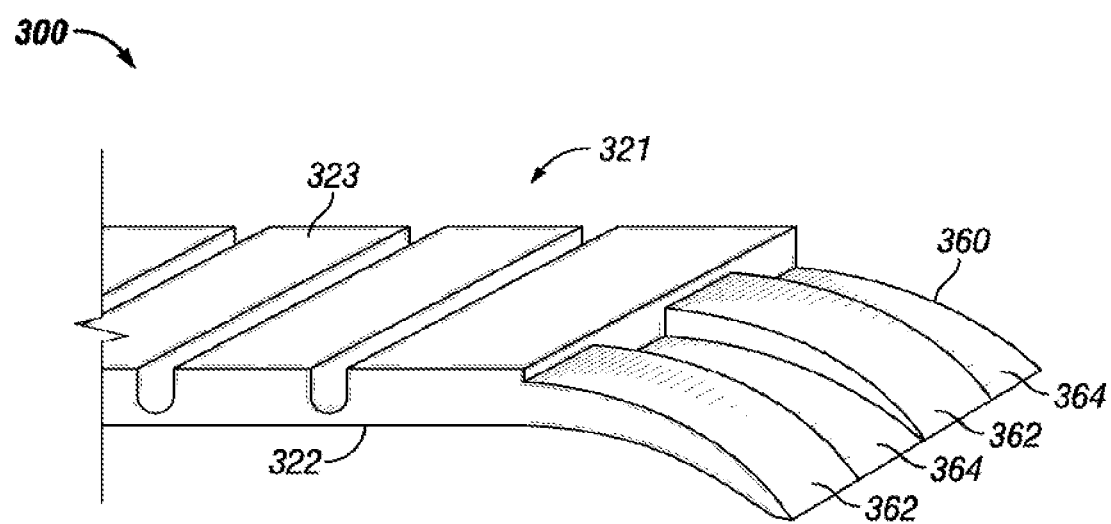
FIG. 5 is a partial cross-sectional view of an exemplary tread having thickened portions arranged along the wing in accordance with an embodiment of the invention.

In particular embodiments, it is also envisioned that a tread 300 may be precured with wings 360 formed in an arcuate profile, as shown in FIG. 5. To aid in increasing the rigidity of the wings 360, the top surface of the wings may include a thickened portion of the wing forming a reinforcing member 362 extending laterally from the central portion 321 to the edge of the tread. The reinforcing 362 members may be molded into the tread 300 or may be formed by or may be formed in the tread after the tread has been unmolded, for example by cutting or by other means of removing tread material from a tread. The reinforcing members 362 may be continuous along the length of the tread 300, although in particular embodiments the reinforcing members 362 may include a series of lateral discontinuities 364. Regardless of the method of manufacturing the treads, the wings 360 with reinforcing members 362 are configured to minimize or reduce deflection of the wings when the wings are subjected to forces from the bottom side of the tread 322, such as the force exerted during a conditioning process of the bottom side of the tread, as described above. In such embodiments the longitudinal discontinuities as described in previous embodiments are optional.

The treads and methods of retreading discussed herein are applicable to pneumatic tires and non-pneumatic tires. Accordingly, it should be understood from the foregoing description that various modifications and changes may be made to the embodiments of the present invention without departing from its true spirit. The foregoing description is provided for the purpose of illustration only and should not be construed in a limiting sense. Accordingly, the scope and content of the invention are to be defined by the terms of the appended claims.

What is claimed is:

1. A method for retreading a tire, the method comprising:
    providing a tire carcass having a prepared bonding surface;
    providing a tread including:
        a length extending in a longitudinal direction,
        a width extending in a lateral direction,
        a top side having a portion for engaging the ground,
        a bottom side for bonding to the tire carcass,
        a central portion having a bottom side forming a portion of the bottom side of the tread and a top side forming a portion of the top side of the tread, wherein the central portion top and bottom sides define a central thickness, and
        a pair of opposed wing portions, where each wing portion of the pair of opposed wing portions extends laterally along the length of the tread from a respective shoulder formed by a respective edge of the central portion, each wing portion having a bottom side forming a portion of the bottom side of the tread and a top side forming a portion of the top side of the tread, wherein the wing portion top side and the wing portion bottom side define a wing thickness, each wing portion including one or more portions each including a discontinuity formed in the top side of the wing portions, the discontinuity extending lengthwise in the longitudinal direction of the tread and depthwise into the one or more portions, the one or more portions forming a convex wing portion top side where each of the one or more portions continuously decrease in thickness as each wing portion extends from the central portion to a lateral edge of the tread where the convex wing portion top side is curved, where the discontinuity is formed in the convex wing portion top side;
    roughening the bottom side of the tread using an abrading device;
    subjecting each wing portion of the pair of opposed wing portions to an upward force from each corresponding wing portion bottom side during the step of roughening by way of the abrading device, such that each wing portion resists upward deflection when subjected to the upward force, thereby maintaining each wing portion bottom side in engagement with the abrading device during roughening;
    contacting the bottom side of the tread with the prepared bonding surface, wherein the step of contacting further includes deflecting downwardly the pair of opposed wing portions to contact the tire carcass; and
    bonding the tread to the tire carcass.

2. The method of claim 1, wherein the discontinuity is continuous along the length of the tread.

3. The method of claim 2, wherein the discontinuity is teardrop-shaped in lateral cross-section.

4. The method of claim 1, wherein the wing thickness is less than the central thickness.

5. The method of claim 1, wherein the discontinuity is a molded feature of the tread.

6. The method of claim 1, where the discontinuity is a narrow groove or elongated slit or slice.

7. The method of claim 6, where the top side of each of the wing portions includes one or more additional discontinuities, the one or more additional discontinuities extending lengthwise in the longitudinal direction of the tread and depthwise into the one or more portions, where the one or more additional discontinuities together with the discontinuity form a plurality of discontinuities.

8. The method of claim 1, where the top side of each of the wing portions includes one or more additional discontinuities, the one or more additional discontinuities extending lengthwise in the longitudinal direction of the tread and depthwise into the one or more portions, where the one or more additional discontinuities together with the discontinuity form a plurality of discontinuities.

9. The method of claim 1, where a void is located at a terminal end of the discontinuity within the wing thickness, the void forming a groove and the discontinuity being a narrow groove or elongated slit or slice that is narrower than the void, where the discontinuity and the void each extends substantially parallel to the bottom side of the wing portion.

10. The method of claim 9, where the discontinuity and the void are each continuous along the length of the tread.

11. The method of claim 9, where the top side of each of the wing portions includes one or more additional discontinuities, the one or more additional discontinuities extending lengthwise in the longitudinal direction of the tread and depthwise into the one or more portions, where the one or more additional discontinuities together with the discontinuity form a plurality of discontinuities.

12. The method of claim 11, where each discontinuity of the plurality of discontinuities and each corresponding void extend substantially parallel to the wing portion bottom side.

13. The method of claim 1, where in maintaining each wing portion bottom side in engagement with the abrading device during roughening, each wing portion bottom side is maintained in sufficient engagement with the abrading device during roughening to roughen each corresponding wing portion bottom side substantially the same as the central portion bottom side.

* * * * *